United States Patent
Prioretti et al.

(10) Patent No.: US 6,824,624 B2
(45) Date of Patent: Nov. 30, 2004

(54) METHOD OF OXYGEN CUTTING A PIECE OF STEEL, AND APPARATUS FOR IMPLEMENTING SAID METHOD

(76) Inventors: Guy Prioretti, 13 rue Alexandre Dreux, Thionville (FR), 57100; Véronique Prioretti, 11 rue Alexandre Dreux, Thionville (FR), 57100; Françoise Prioretti-Hacking, 13 rue Alexandre Dreux, Thionville (FR), 57100; Jean-Michel Prioretti, 2 rue Pellerin, Manom (FR), 57100

( * ) Notice: Subject to any disclaimer, the term of this patent is extended or adjusted under 35 U.S.C. 154(b) by 280 days.

(21) Appl. No.: 10/179,269

(22) Filed: Jun. 26, 2002

(65) Prior Publication Data
US 2003/0000356 A1 Jan. 2, 2003

(30) Foreign Application Priority Data
Jul. 2, 2001 (FR) .............................. 01 08730

(51) Int. Cl.$^7$ ................................ B23K 7/00
(52) U.S. Cl. ........................ 148/205; 266/67
(58) Field of Search ................ 266/48, 67; 148/205, 148/200, 203; 83/15, 13, 170

(56) References Cited
U.S. PATENT DOCUMENTS
6,334,906 B1 * 1/2002 Donze et al. ............... 148/203

FOREIGN PATENT DOCUMENTS

| DE | 84 28 017 | 2/1985 |
| EP | 0 235 588 A1 | 9/1987 |
| FR | 2 799 674 A | 4/2001 |
| WO | WO 01/28727 A1 * | 4/2001 ................ 266/48 |

* cited by examiner

Primary Examiner—Scott Kastler
(74) Attorney, Agent, or Firm—Sughrue Mion, PLLC

(57) ABSTRACT

The invention relates to a method and apparatus for oxygen cutting pieces of steel, in which a cutter member (5) is positioned above a top face of the piece to be cut, and trimmer and spray members (10, 11) are positioned beneath the piece to be cut, said members being carried by a support blade which passes through the cut slot. According to the invention, at least one pressurized fluid (22) is projected directly into the cut slot (1.3) and into the portion thereof that lies between the cutting front and the blade-shaped support of the cutter and spray members, said jet forming a barrier protecting said blade-shaped support against particle projections during forward advance of the support along the cut slot (1.3). This eliminates the risk of forward advance of the blade-shaped support in the cut slot encountering any obstacles, thereby making it possible to implement cutting speeds that are very high.

14 Claims, 2 Drawing Sheets

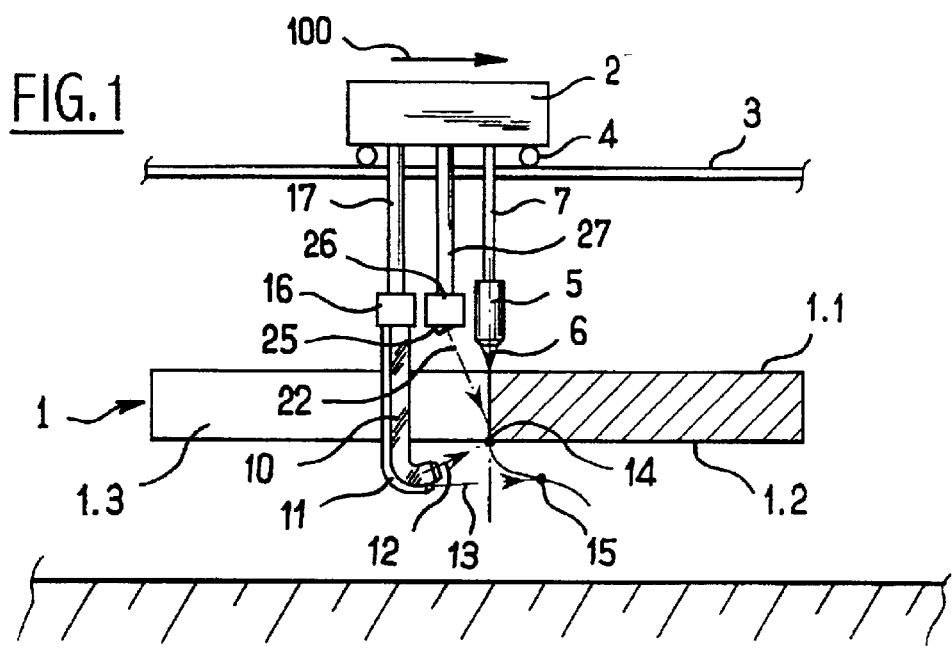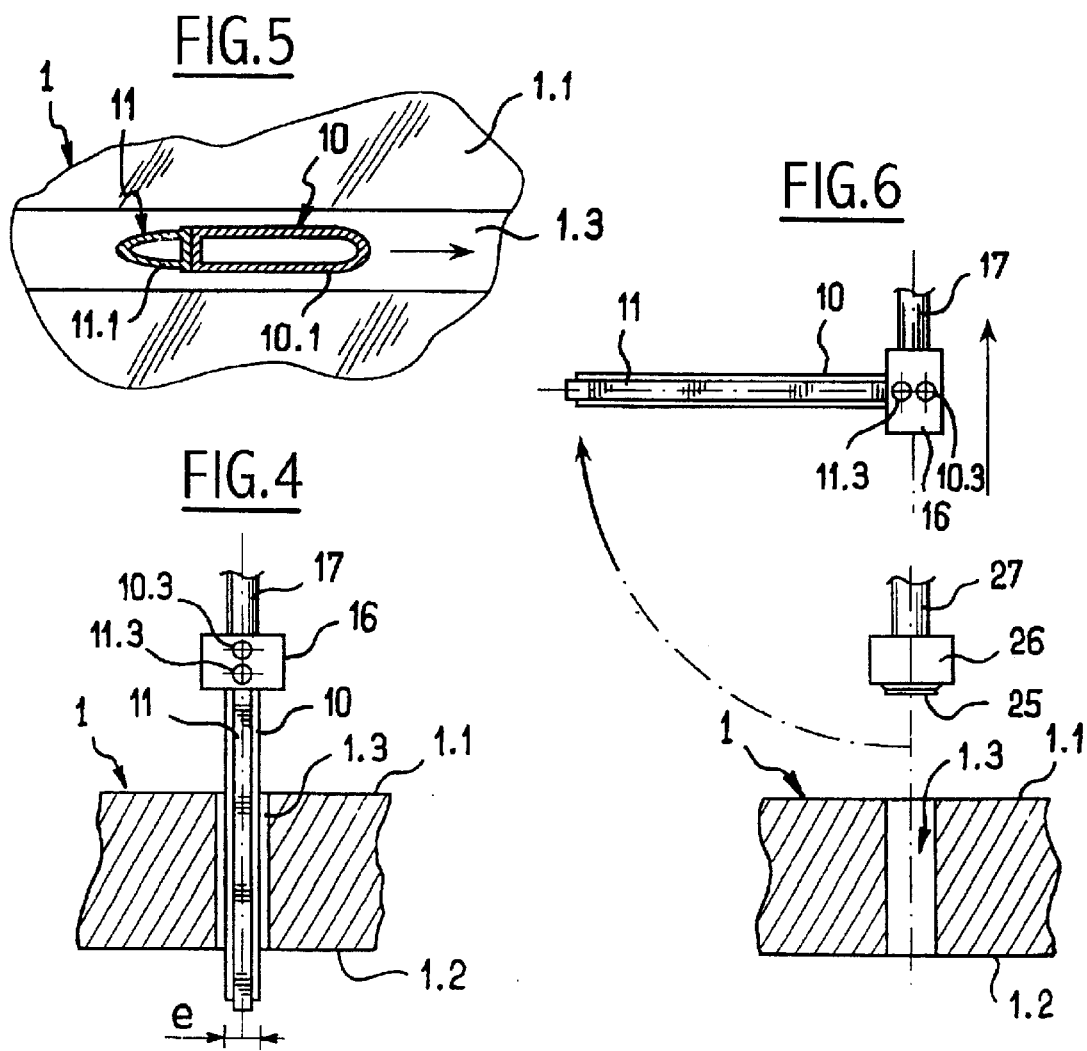

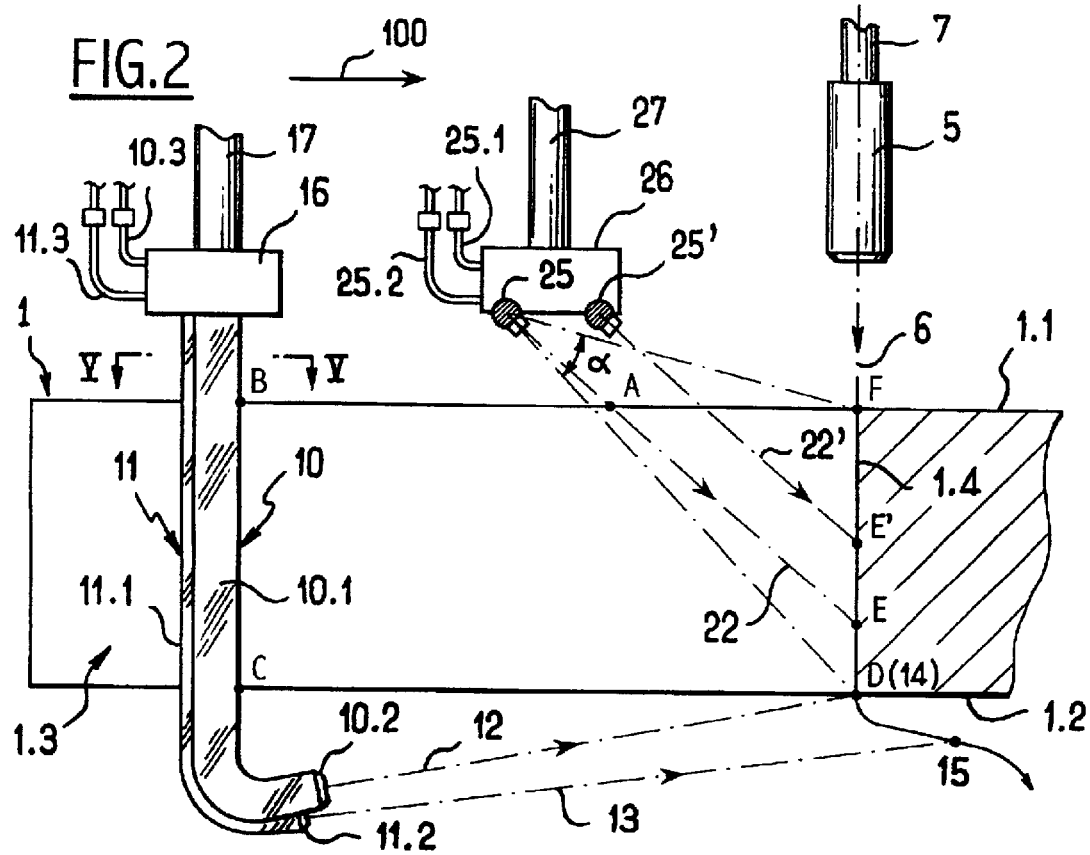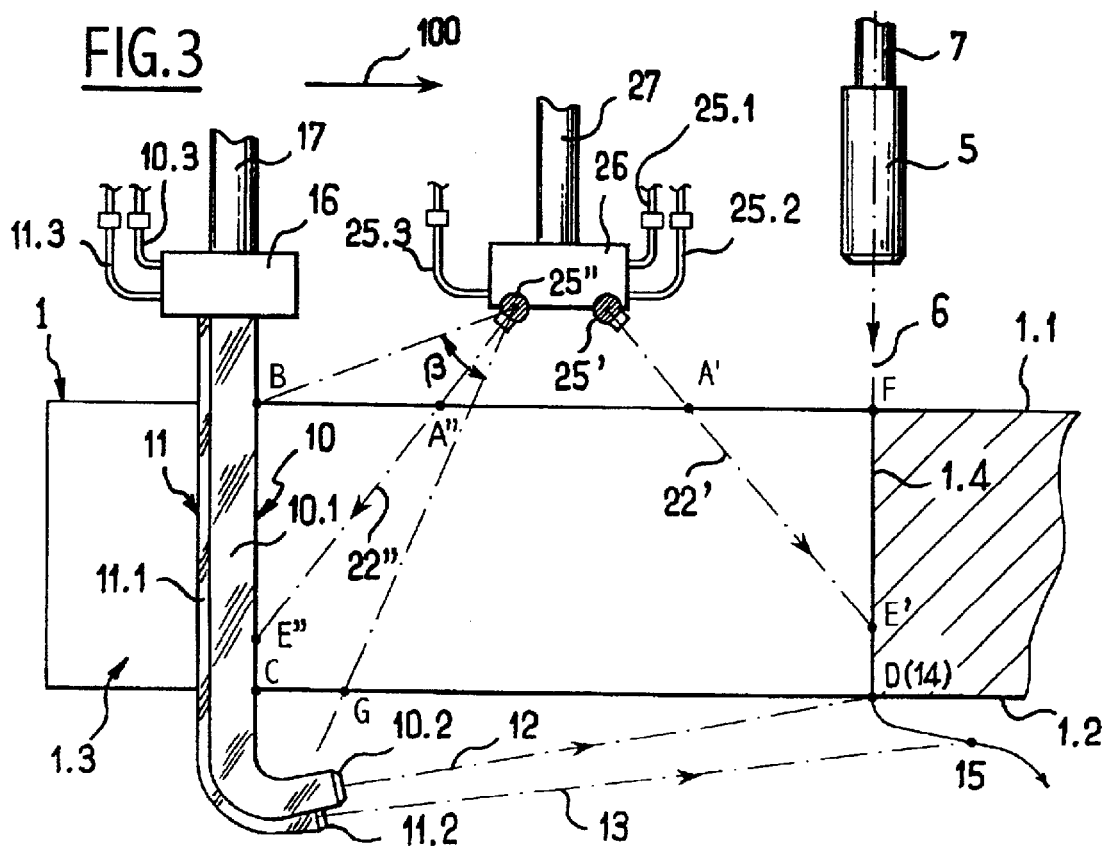

METHOD OF OXYGEN CUTTING A PIECE OF STEEL, AND APPARATUS FOR IMPLEMENTING SAID METHOD

The present invention relates to a method and to apparatus for oxygen cutting pieces of steel, such as slabs, sheets, billets, and blooms.

The technological background is illustrated by document EP-A-0 639 416 which describes a two-line oxygen cutting installation, in which each line has a moving carriage with an oxygen cutting torch of the pendular or swinging type.

Document EP-A-0 235 588 describes a similar installation using a main torch that performs pendular motion above the piece to be cut transversely, and an additional torch for trimming the cutting bead. Document DE-U-84 28 017 describes another installation for oxygen cutting, which installation uses nozzles placed beneath the slab so as to expel projections horizontally, and nozzles for projecting water, also disposed beneath the slab, for cooling an anti-erosion plate. Reference can also be made to document U.S. Pat. No. 2,820,420 which describes an oxygen cutting torch mounted so as to be cantilevered out on a carriage that can be moved horizontally, and to document WO-A-96/20818 which describes an overhead crane supporting a telescopically extensible vertical working arm.

It is known that the operation of oxygen cutting pieces of steel, and more specifically pieces such as slabs, sheets, billets, and blooms in steel works, generally generates residues of unburnt molten metal on the exit surface for the cutter jet, with a fraction thereof not being expelled into ambient air by the cutter jet but becoming stuck to and solidifying on the exit lips of the cut slot, with this taking place over the entire length of the slot, thereby forming respective cutting beads. These unwanted beads adhere strongly to the bodies of such cut pieces, and it is necessary to implement an additional operation for removing the beads which are of greater or lesser size depending on the grade of steel involved, the cutting speed, and the type and adjustment of oxygen cutting torch. In the past, cutting beads were generally removed either by manual trimming using a torch or a chisel, or else mechanically using an appropriate machine.

Proposals have subsequently been made to trim the cutting bead simultaneously with the bead being formed on the face of the piece in question, as described in document WO-A-99/16570. Nevertheless, that technique makes use of a horizontal cutter jet which means that it is unsuitable for cutting slabs or other products of great width. In addition, the flow of molten metal remains incomplete when using horizontal cutter jets, so detaching the particles that constitute the cutting bead requires a trimming jet that is very powerful in order to be capable of expelling the molten particles downwards. Finally, conventional techniques do not make it possible to avoid the presence of a large amount of smoke in the exit zone of the cutter jet, with such smoke emissions being generated by the post-combustion of unburnt molten metal residues that are ejected by the cutter jet and by the trimmer jet.

The above-mentioned drawbacks have been overcome to a large extent by an oxygen cutting method in which a cutter member is moved in such a manner that the cutter jet is directed towards a first face of the piece in order to attack said piece in a substantially vertical direction so as to form a slot, and synchronously therewith a trimmer member and a spray member are moved in such a manner that their respective jets are directed towards a second face of said piece, opposite from its first face, attacking said second face in an oblique direction at the cutter jet exit so as to trim the cutting bead being formed on said second face while simultaneously reducing smoke emission, said trimmer and spray members being carried by a blade-shaped support passing through the cut slot. Document WO-A-01/28727 in the name of the Applicant describes such an oxygen cutting method in detail together with associated apparatus for implementing the method. The use of a blade-shaped support passing directly through the cut slot is very attractive insofar as all of the active components of the apparatus for implementing the method can be located above the piece to be cut, leaving the space under said piece unoccupied. Nevertheless, it has been found that incidents can arise in operation, e.g. due to excessive cutting speed or to defects in the metal being cut such as inclusions or seams, which incidents can lead to showers of particles being generated in which the particles are constituted by a mixture of molten steel and slag and in which these particles strike the blade-shaped support inside the cut slot. When such incidents or defects occur during the cutting process, the showers of particles can generate obstructions and can even jam the blade-shaped support, preventing it from advancing normally and thus preventing the associated trimmer member from advancing. This makes the cutting and trimming operation insufficiently reliable and makes high cutting speeds completely unattainable.

In addition, when the pieces being cut are slabs coming directly from continuous casting in steel works, the temperatures involved are very high (about 1000° C.) such that the blade-shaped support supporting the trimmer member is heated very severely, and such heating can prevent the trimming process from being continued normally.

An object of the invention is to provide a method of oxygen cutting a piece of steel, and apparatus for implementing the method, capable of cutting a wide variety of pieces of steel in regular manner without leaving a cutting bead and without emitting smoke, and above all without running the risk of jamming the forward advance of the trimmer member whose support passes through the cut slot. It is also desirable for the technique to be capable of cutting pieces of steel that come directly from continuous casting.

According to the invention, this problem is solved by a method of oxygen cutting a piece of steel, in which a cutter member is moved in such a manner that the cutter jet is directed towards a first face of the piece in order to attack said face in a substantially vertical direction so as to form a slot, and synchronously therewith a trimmer member and a spray member are moved in such a manner that their respective jets are directed towards a second face of the piece, opposite from its first face, attacking said second face in an oblique direction at the cutter jet exit so as to trim the cutting bead being formed on said second face while simultaneously reducing smoke emission, said trimmer and spray members being carried by a blade-shaped support passing through the cut slot, said method being remarkable in that at least one pressurized fluid jet is projected directly into the cut slot and into the portion thereof which lies between the cutting front and the blade-shaped support, said jet forming a barrier protecting said blade-shaped support against particle projections during advance of the support along the cut slot.

The jet of pressurized fluid thus emitted directly into the cut slot provides a genuine protective barrier or curtain by creating a protected zone in the cut slot, and it does this over the entire thickness of the piece of steel being cut, expelling from the slot all unwanted particles created by the cutter jet. By eliminating any risk of the blade-shaped support being obstructed, it is possible to envisage very high advance speeds while cutting, speeds that are at least twice the advance speeds that can be obtained with traditional oxygen cutting techniques.

In a first implementation of the method of the invention, at least one fluid jet is projected obliquely towards the cutting front, and preferably towards the lower portion of said cutting front. It is then preferable for the selected fluid to be an oxygen cutting fluid, and in particular oxygen or a mixture of oxygen and a fuel gas. The fluid jet projected directly into the cut slot then also makes it possible perform additional cutting in the lower portion of the cutting front, and also makes it possible to deliver additional heat, which improves the performance of the vertical cutting jet, thereby further facilitating advance of the blade-shaped support inside said cut slot.

In a variant implementation, which can be combined with the first implementation specified above, at least one fluid jet is projected towards the blade-shaped support for the trimmer member or towards said member itself. In which case it is preferable for the selected fluid to be a cooling fluid, in particular water or compressed air. The fluid jet projected directly into the cut slot then also performs a function of cooling the blade-shaped support, in addition to providing it with protection against projected particles. This is particularly advantageous when cutting a hot slab that comes directly from continuous casting, where temperature conditions commonly reach 1000°C.

Also advantageously, the protective jet(s) is/are emitted from one or more projection members moved horizontally synchronously with the cutter, trimmer, and spray members, all of the jets remaining in a common vertical plane.

The invention also provides apparatus for implementing the above-specified oxygen cutting method, the apparatus being of the type comprising a carriage movable horizontally on associated rails over the piece that is to be cut, said carriage carrying a blade-shaped support arranged to pass through the cut slot and supporting at its bottom end trimmer and spray members that pass beneath said piece, the apparatus being remarkable in that said carriage also supports at least one projection member above the piece to be cut and disposed upstream from the blade-shaped support relative to the travel direction of the carriage to project a jet of pressurized fluid directly into the cut slot. It will be understood that by mounting the trimmer, spray, and projection members on the same carriage, it is guaranteed that the horizontal travel of said members is completely synchronous.

Preferably, the carriage also carries a support for a cutter member above the piece to be cut, said cutter member being disposed upstream from said at least one projection member to project an oxygen cutter jet engaging the top face of said piece vertically and forming the cut slot. Thus, all of the cutter, trimmer, spray, and projection members advance in completely synchronous manner during the oxygen cutting process.

It is then preferable for the supports for the various cutter, trimmer, spray, and projection members to be arranged in such a manner that all of the jets emitted by said members remain in a common vertical plane. All of these jets then remain accurately positioned relative to the vertical midplane of the cut slot.

Advantageously, the fluid projection member(s) is/are adjustable in height and/or in inclination.

It is then preferable for the projection member(s) to be adjusted in position in such a manner that the emitted jet(s) is/are directed either towards the cutting front, or towards the blade-shaped support for the trimmer member or towards said member itself. In particular, the projection member(s) is/are connected to sources of oxygen cutting fluid for projection towards the cutting front, or to sources of cooling fluid for projection towards the blade-shaped support of the trimmer member or towards said member.

Also preferably, the blade-shaped support for the trimmer and spray members is vertically retractable in an upward direction, said members also being of a thickness such as to enable them to penetrate into the cut slot. It is then possible to retract the trimmer and spray members to bring them into the cut slot, and thus to retract them completely from beneath the bottom face of the piece to be cut, thus making it possible to go past any obstacles on their path that might be situated beneath the piece of steel that is to be cut and that can arise during advance of the cutter carriage. Such vertical retraction is naturally temporary, and the assembly can then be lowered back down into the oxygen cutting position once the obstacle has been passed.

Provision can then also be made for the blade-shaped support of the trimmer and spray members further to include a hinge enabling pivoting about a horizontal axis so as to bring the trimmer and spray jets into a horizontal plane once the corresponding trimmer and spray members have been fully withdrawn from the cut slot. In this case, when merely retracting these members into the inside of the cut slot does not suffice, said members can be raised above the piece to be cut, after which they can be tilted through 90° so as to be brought into a horizontal plane. This avoids the trimmer jet producing negative effects inside the cut slot of the kind that would otherwise arise during partial retraction in order to go past obstacles of large size.

Other characteristics and advantages of the invention appear more clearly in the light of the following description and the accompanying drawings relating to particular embodiments, and with reference to the figures, in which:

FIG. 1 is a diagram of an installation implementing an oxygen cutter method of the invention with implementation apparatus constituted in this case by a single carriage moving horizontally;

FIG. 2 is a diagrammatic view on a larger scale showing the members used in the context of the method of the invention, with a jet of protection fluid being projected onto the cutting front;

FIG. 3 shows a variant in which the jet of protective fluid is projected towards the blade-shaped support of the trimming member or towards said member;

FIG. 4 is an end view of components shown in FIGS. 2 and 3, revealing more clearly the passage for the blade-shaped support in the cut slot;

FIG. 5 is a section on V—V of FIG. 2, showing the pipes for passing fluid inside the thin blade-shaped support; and FIG. 6 is an end view corresponding to FIG. 4, but after the trimming and spray members have been raised and pivoted so as to retract said members completely.

FIG. 1 shows a piece of steel 1 such as a slab, a billet, or a bloom being cut using an oxygen cutting method of the invention. The piece 1 for cutting can have a thickness of about 200 millimeters (mm) or more, and presents a top face 1.1 and an opposite bottom face 1.2, and it rests horizontally on supports (not shown in the figure). A carriage 2 can move on rails 3 by means of wheels 4, above the piece 1 for cutting.

In conventional manner, the carriage 2 carries a cutter member 5 such as an oxyacetylene cutter torch, by means of an associated rigid support 7 so that said cutter member 5 lies above the piece 1 for cutting. The carriage 2 also has an element 17 carrying a block 16 fitted with a support in the form of a blade arranged to pass through the cut slot and supporting at its bottom end trimming and spray members that pass beneath said piece. In FIG. 1, reference 10 designates the trimming assembly and reference 11 the spray assembly.

FIG. 1 also shows the three jets issued by the above-mentioned members 5, 10, and 11. The cutting jet 6 is directed towards the top face 1.1 of the piece to be cut so as to engage said face in a direction that is substantially vertical, thereby forming a slot referenced 1.3. The trimming member 10 which is positioned beneath the piece 1 for cutting is positioned in such a manner that the trimmer jet referenced 12 engages the bottom face 1.2 of the piece 1 in an oblique direction pointing towards the outlet point referenced 14 of the cutter jet 6. The spraying member 11 is positioned in such a manner that the spray jet referenced 13 is emitted towards the molten particles ejected by the cutter jet 6 in order to reduce the emission of smoke. The arrangement of the cutter member 5, the trimming member 10, and the spray member 11 is such that the three corresponding jets respectively referenced 6, 12, and 13 are all contained within a common vertical plane throughout the cutting process. The fluid sprayed by the spray member 11, which can be water or oxygen, acts as an extinguisher fluid with respect to the incandescent particles. By spraying cold fluid in this way on the particles of steel in post-combustion coming from the cutter and trimmer jets, it is possible to reduce to a considerable extent the volume of smoke that is emitted. It should be observed that the spray jet 13 is directed towards a zone referenced 15 which corresponds to the top of the free-fall parabola of the molten particles. The particles initially pick up kinetic energy from the cutter jet 6 and the trimmer jet 12, so their trajectory presents a point of inflection with a horizontal tangent prior to beginning parabolic free-fall corresponding solely to the influence of gravity. This point of inflection which corresponds to above-mentioned zone 15 thus constitute the ideal target for the spray jet, since the particles are then traveling at substantially zero speed.

In this respect, reference can advantageously be made to document WO-A-01/28727 in the name of the Applicant for fuller explanation on this technique of performing trimming and spraying simultaneously with cutting.

In accordance with an essential characteristic of the invention, at least one jet 22 of pressurized fluid is projected directly into the cut slots 1.3 in the portion of the slot which lies between the cutting front and the blade-shaped support for the trimmer and spray members, said jet 22 forming a protective barrier against particles being projected onto said blade-shaped support as it advances along the cut slot 1.3. The pressure used is preferably relatively high, for example about $10^6$ Pascals (10 atmospheres).

In practice, the carriage 2 carrying the support for the cutter member 5 and for the trimmer and spray members 10 and 11, also carries a support 27 for a block 26 arranged to overlie the piece to be cut 1, said block having at least one projection member 25 disposed upstream from the blade-shaped support in the travel direction of the carriage 2 (arrow 100) to project a jet 22 of pressurized fluid directly into the cut slot 1.3. The pressurized fluid jet 22 then forms a protective curtain serving to protect the blade-shaped support that is traveling in the cut slot against the undesired particles created by the cutter jet 6. These particles are returned into the zone (triangular in this case) defined by the cutter jet 6 and the pressurized fluid jet 22, and they are ejected from the cut slot 1.3 under the combined action of both of these jets.

The main components of the installation are described in greater detail below with reference to FIGS. 2 and 3, which figures show only the cutter members, the trimmer and spray members, and the pressurized fluid projection members during the oxyacetylene cutting process.

There can be seen the cutter member 5 emitting a cutter jet 6 which engages the top face 1.1 of the piece to be cut at a point referenced F. The cutter jet 6 leaves via the opposite face 1.2 at a point 14 also referenced G. Line segment FD constitutes a cutting front (referenced 1.4). The trimmer member 10 has a support portion in the form of a thin blade referenced 10.1 passing through the cut slot 1.3 and mounted on the support block 16. The bottom of the thin blade 10.1 is terminated by a nozzle 10.2 shaped to emit the desired jet 12 suitable for performing the trimming function on the cutting bead, said jet being directed towards the outlet point D. Behind and below the trimmer member 10, there is provided a spray member 11 having a blade-shaped portion 11.1 likewise dimensioned to be able to pass through the cut slot 1.3, which portion is terminated at the bottom by a nozzle 11.2 which is dimensioned to ensure that the spray jet 13 is shaped in the desired manner towards the point 15, as explained above.

FIG. 2 also shows the feed pipes associated with the trimmer and spray members 10 and 11, which pipes are connected in this example to the support block 16: there can thus be seen a pipe 10.3 serving to feed trimmer oxygen to the inside of the blade-shaped support 10.1 leading to the ejection nozzle 10.2 for trimming purposes, and a pipe 11.3 for feeding the fluid for cooling and extinguishing the smoke along the inside of the blade-shaped support 11.1 to the ejection nozzle 11.2. References B and C designate the points level with the top and bottom edges respectively of the blade-shaped support where it goes past the top and bottom faces 1.1 and 1.2 of the piece 1 to be cut. Thus, line segments FD and BC define an intermediate space in the cut slot 1.3 and it is specifically in this space that fluid projection is organized, in accordance with the invention, to form a protective barrier against particles being projected.

There can be seen the support block 26 secured to a column 27, and fitted with at least one projection member overlying the piece 1 to be cut and disposed upstream from the blade-shaped support in the travel direction of the carriage 2 (arrow 100) for the purpose of projecting a jet of pressurized fluid directly into the cut slot 1.3.

Specifically, a fluid jet 22 is projected obliquely from a projection member 25 towards the cutting front 1.4, and preferably towards the bottom portion of said cutting front. The fluid jet 22 intersects the plane of the top face 1.1 of the piece 1 for cutting at a point referenced A, and said jet 22 strikes the cutting front 1.4 at a point referenced E. Naturally, the protective jet 22 delivered by the projection member 25 is directed so as to avoid coming out directly from the slot 1.3, so as to avoid disturbing the oxygen trimmer jet. Thus, point E is preferably located slightly above outlet point D for the cutter jet 6.

Naturally, the device could also include at least one additional fluid jet striking some other point of the cutting front 1.4. By way of example, the figure shows an additional projection member 25' likewise carried by the same block 26 and its associated column 27, which projection member emits a protective jet referenced 22' that strikes the cutting front 1.4 at a point E'. A jet 22' is shown directed on a direction that is substantially parallel to the direction of the jet 22, but it would naturally be possible to choose a direction at a different slope. Furthermore, it is advantageous to provide for the projection members 25 and 25' to be adjustable in height and/or inclination. This makes it possible to target accurately the point(s) of impact of the protective jet(s) on the cutting front 1.4 as a function of the various products that are to be cut. In practice, using a single protective jet 22, the point of impact E lies between the points D and F, thereby defining an angular range of angle α for possible angles of inclination for said fluid jet.

The main function of the pressurized fluid jet 22 is to form a protective barrier against particles being projected onto the blade-shaped support as it advances along the cut slot 1.3. Nevertheless, and as shown in the embodiment of FIG. 2, when the fluid jet 22 is projected obliquely towards the cutting front 1.4, and preferably towards the lower portion of said cutting front, it is advantageous to provide for the fluid selected for this jet to be an oxygen cutting fluid, and in particular oxygen or a mixture of oxygen and a fuel gas. With oxygen, additional cutting is performed in the lower portion of the cutting front 1.4, i.e. in its portion corresponding to segment ED (where E is the point of impact of the jet against the cutting front). However, rather than providing a jet of pure oxygen, it is advantageous to provide a jet comprising a mixture of oxygen and of fuel gas capable of supplying additional heat energy to said lower portion of the cutting front (segment ED), thereby further increasing the speed performance of the equipment cutting the piece of steel. Thus, under such circumstances, the jet of fluid under pressure serves both to perform a protection function against particles being projected onto the blade-shaped support, and an additional function of improving oxygen cutting performance. This second function presents considerable practical advantages since it makes it possible to consider performing oxygen cutting at speeds that are considerably more than twice the speeds conventionally used in traditional installations. FIG. 2 also shows the feed pipes associated with the projection member 25 (and optionally 25'); there can thus be seen a pipe 25.1 for feeding oxygen, and a pipe 25.2 for feeding a fuel gas. These two feed pipes are shown as being connected to the support block 26, however that merely constitutes one possible specific embodiment.

A variant as shown in FIG. 3 is described below.

In this figure, the block 26 is fitted both with a projection member 25' projecting the fluid jet 22' obliquely towards the cutting front 1.4 as described above in detail with reference to FIG. 2, together with a projection member 25" serving to project a fluid jet 22" towards the blade-shaped support 10.1 that supports the trimmer member 10.2, or else directly towards said trimmer member. This fluid jet 22" is likewise capable of providing a protective barrier against particles being projected onto the blade-shaped support, providing, naturally, that the main portion of said support in the cut slot is involved with the jet 22", i.e. that the point of impact referenced E", of said jet is close to the point C. It is then advantageous to select a protective fluid in such a manner as to obtain an additional function for the jet which is projected towards the blade-shaped support of the trimmer member or towards said trimmer member. The selected fluid is preferably a cooling fluid, in particular water or compressed air. This produces a cooling effect on the blade-shaped support for the trimmer member which is particularly advantageous when the piece being cut is a hot slab whose temperature can be very high, as is the case when cutting hot slabs that are delivered by continuous casting in steel works, where temperatures can be close to 1000° C. The fluid projection member 25" is also preferably adjustable in inclination and in height relative to the associated support block 26. Concerning the inclination of the fluid jet 22", the theoretical possible angular range represented by an angle β in the figure goes from the direction leading to the point of impact B on the face 1.1 of the piece 1 to vertical. Nevertheless, it is preferable in practice for the angular range to be more limited, going from the line leading to a point of impact E" relatively close to the point C down to a point G in the bottom face 1.2 of the piece 1 and corresponding to the direction of a jet that will strike the end of the support for the trimmer member, so as to avoid disturbing emission of the trimmer jet. Thus, the jet 22" then performs two functions, both the function of providing protection against particles being projected onto the blade-shaped support, and cooling of said blade-shaped support.

In FIG. 2, it can be seen that the fluid jet 22 projected obliquely towards the cutting front 1.4 forms a barrier against particles being projected, said particles then being confined in the triangle AFE, without penetrating into the approximately trapezium-shaped zone ABCDE. The particles are then sent towards the bottom vertex of the triangle, and are finally ejected at the cutter jet exit, i.e. at point D. This effect is doubled or tripled if additional jets are used for progressively confining the particles against the cutting front, prior to final ejection thereof. In FIG. 3, the same particle-confining curtain effect in the triangle A'E'F' is to be found provided by the action of fluid jet 22' which is directed obliquely towards the cutting front 1.4. The fluid jet 22" also forms a protective curtain, which can be used on its own or in combination with the preceding curtain constituted by the jet 22', serving to confine those few particles that penetrate into the six-sided zone defined by points A', A", E", C, D, and E'. In addition, the triangular zone defined by the points A", E", and B is fully concerned by the cooling action exerted on the upstream edge of the blade-shaped support.

It will be understood that under all circumstances, the protective jets 22, 22', 22" are emitted from projection members which are moved horizontally synchronously with the cutter, trimmer, and spray members, so that all of the jets 6, 12, 13, 22, 22', 22" remain in the same vertical plane during the cutting process. This overall plane is the midplane of the slot 1.3.

Finally, as can be seen in FIG. 3, not only are there feed pipes 25.1 and 25.2 for feeding oxygen and fuel gas respectively to the projection member 25', directing a jet 22' towards the cutting front 1.4, but there is also a cooling fluid feed pipe 25.3 which is associated with the projection member 25" emitting a jet 22" directed towards the blade-shaped support for the trimmer member or towards said member itself.

FIG. 4 is an end view showing the blade-shaped support for the trimmer and spray members. It should be observed that these members are of a thickness that enables them to pass through the cut slot 1.3 if it is desired that said members should be retractable vertically. In practice, it is possible to use a thin blade of thickness of about 4 mm, which corresponds to about half the conventional width of a slot obtained by oxygen cutting.

In order to travel past any obstacles that might be situated beneath the steel piece for cutting, and that could get in the way of forward advance of the oxygen cutting equipment, it is advantageous to be able to retract the blade-shaped support for the trimmer and spray members vertically on a temporary basis. It is then advantageous to organize the installation in such a manner that the blade-shaped support for the trimmer and spray members is vertically retractable in an upward direction so as to be capable of being hidden inside the slot 1.3.

It is also possible to provide for withdrawing said members completely from the slot, until the underlying obstacle has disappeared. Under such circumstances, it is preferable not to disturb the inside volume of the slot with the trimmer jet, so it is advantageous to be able to withdraw the blade-shaped support completely. It is then advantageous to provide a hinge at the block 16 enabling the support to pivot about a horizontal axis so as to bring the trimmer and spray jets into a horizontal plane once the corresponding trimmer and spray members 10.2 and 11.2 have been fully withdrawn from the slot 1.3. In practice, while the trimmer member is being withdrawn, the oxygen feed to the trimmer jet is turned off together with the oxygen feed to the vertical cutting torch. This possibility is shown in FIG. 6. This figure shows the new position for the blade-shaped support of the trimmer and spray members which has been moved into a horizontal plane, i.e. a plane parallel to the top face of the piece that is to be cut. As a result, FIG. 6 shows means serving to project at least one jet of fluid directly into the slot, said means being arranged upstream from the support blade.

The detail of FIG. 5 shows the structure of the blade-shaped support, with its internal passages for passing the fluid for cooling and extinguishing the smoke associated with the spray member 11, and for passing the trimming oxygen associated with the trimmer member 10.

A method and apparatus are thus provided for oxygen cutting that make it possible simultaneously to treat the cutting feed effectively and to reduce the amount of smoke emitted, while also providing effective protection against any risk of obstruction by means of particles engaging the support blade passing through the cut slot, and as a result making very high speeds of operation possible. Furthermore, the fluid jet can be used for an additional function of improving oxygen cutting performance when projection is applied to the cutting front, or of cooling the support blade when projection is applied thereto.

The invention is not limited to the embodiments described above, but on the contrary it covers any variant using equivalent means to reproduce the essential characteristics specified above.

In particular, although apparatus for implementing the invention is described that comprises a single carriage carrying all of the cutter, trimmer, spray, and projection members, it would naturally be possible to provide a separate carriage for the cutter member, providing care is taken to ensure that both carriages are moved synchronously on their associated support rails. Finally, any appropriate device can be provided for adjusting position in a manner that is obvious to the person skilled in the art in order to adapt the apparatus to cutting pieces of steel of any kind.

What is claimed is:

1. A method of oxygen cutting a piece of steel, in which a cutter member is moved in such a manner that the cutter jet is directed towards a first face of the piece in order to attack said face in a substantially vertical direction so as to form a slot, and synchronously therewith a trimmer member and a spray member are moved in such a manner that their respective jets are directed towards a second face of the piece, opposite from its first face, attacking said second face in an oblique direction at the cutter jet exit, so as to trim the cutting bead being formed on said second face while simultaneously reducing smoke emission, said trimmer and spray members being carried by a blade-shaped support passing through the cut slot, wherein at least one pressurized fluid jet is projected directly into the cut slot and into the portion thereof which lies between a cutting front and the blade-shaped support, said jet forming a barrier protecting said blade-shaped support against particle projections during advance of the support along the cut slot.

2. A method according to claim 1, wherein at least one fluid jet is projected obliquely towards the cutting front, and towards the lower portion of said cutting front.

3. A method according to claim 2, wherein the selected fluid is an oxygen cutting fluid, comprising at least one of oxygen and a mixture of oxygen and a fuel gas.

4. A method according to claim 1, wherein at least one fluid jet is projected towards the blade-shaped support for the trimmer member or towards said member itself.

5. A method according to claim 4, wherein the selected fluid is a cooling fluid, comprising at least one of water and compressed air.

6. A method according to claim 1, wherein the protective jet(s) is/are emitted from one or more projection members moved horizontally synchronously with the cutter, trimmer, and spray members, all of the jets remaining in a common vertical plane.

7. Apparatus for implementing the oxygen cutting method according to claim 1, the apparatus comprising a carriage movable horizontally on associated rails over the piece that is to be cut, said carriage carrying a blade-shaped support arranged to pass through the cut slot and supporting at its bottom end trimmer and spray members that pass beneath said piece, wherein said carriage also supports at least one projection member above the piece to be cut and disposed upstream from the blade-shaped support relative to the travel direction of the carriage to project a jet of pressurized fluid directly into the cut slot.

8. Apparatus according to claim 7, wherein the carriage also carries a support for a cutter member above the piece to be cut, said cutter member being disposed upstream from said at least one projection member to project an oxygen cutter jet engaging the top face of said piece vertically and forming the cut slot.

9. Apparatus according to claim 8, wherein the supports for the various cutter, trimmer, spray, and projection members are arranged in such a manner that all of the jets emitted by said members remain in a common vertical plane.

10. Apparatus according to claim 7, wherein the fluid projection member(s) is/are adjustable in height and/or in inclination.

11. Apparatus according to claim 10, wherein the projection member(s) is/are adjusted in position in such a manner that the emitted jet(s) is/are directed either towards the cutting front, or towards the blade-shaped support for the trimmer member or towards said member itself.

12. Apparatus according to claim 11, wherein the projection member(s) is/are connected to sources of oxygen cutting fluid for projection towards the cutting front, or to sources of cooling fluid for projection towards the blade-shaped support of the trimmer member or towards said member.

13. Apparatus according to claim 7, wherein the blade-shaped support for the trimmer and spray members is vertically retractable in an upward direction, said members also being of a thickness such as to enable them to penetrate into the cut slot.

14. Apparatus to claim 13, wherein the blade-shaped support of the trimmer and spray members includes a hinge enabling pivoting about a horizontal axis so as to bring the trimmer and spray jets into a horizontal plane once the corresponding trimmer and spray members have been fully withdrawn from the cut slot.

* * * * *